United States Patent [19]

Van den Heuvel

[11] Patent Number: 5,375,250
[45] Date of Patent: Dec. 20, 1994

[54] METHOD OF INTELLIGENT COMPUTING AND NEURAL-LIKE PROCESSING OF TIME AND SPACE FUNCTIONS

[76] Inventor: Raymond C. Van den Heuvel, 18618 Celtic St., Northridge, Calif. 91326

[21] Appl. No.: 912,899

[22] Filed: Jul. 13, 1992

[51] Int. Cl.⁵ ............................................. G06F 15/18
[52] U.S. Cl. .................................. 395/800; 364/221; 364/274.9; 364/DIG. 1
[58] Field of Search ................ 395/800, 400, 425, 51; 364/607, 800; 365/230.05

[56] References Cited

U.S. PATENT DOCUMENTS

| | | | |
|---|---|---|---|
| 3,638,004 | 1/1972 | Sloane et al. | 364/726 |
| 3,767,905 | 10/1973 | Garde | 364/726 |
| 4,020,334 | 4/1977 | Powell et al. | 364/726 |
| 4,630,229 | 12/1986 | D'Hondt | 364/726 |
| 4,649,506 | 3/1987 | Van den Heuvel | 364/607 |
| 4,727,510 | 2/1988 | Scheuneman et al. | 395/400 |
| 4,787,055 | 11/1988 | Bergeron et al. | 364/726 |
| 4,809,222 | 2/1989 | Van den Heuvel | 395/51 |
| 4,895,711 | 1/1990 | Biffar et al. | 502/339 X |
| 4,956,331 | 9/1990 | Tsurumi et al. | 502/339 |
| 4,967,398 | 10/1990 | Jamoua et al. | 365/230.05 |
| 4,984,176 | 1/1991 | Van den Heuvel | 395/51 |
| 5,036,493 | 7/1991 | Nielsen et al. | 365/230.03 |

*Primary Examiner*—Alyssa H. Bowler
*Assistant Examiner*—John Harrity

[57] ABSTRACT

The contents of an organic memory at an address A are multiplied by a quality factor Q and then added to a signal ID from a sensor or an external source of data, selected randomly and in real time, multiplied by a weight factor W. The sum obtained in this way is stored back at the same address A. The process is repeated for different values of ID, W, Q and A in a sequence that represents an evolution program. The result is a neural network with individually programmable, exponential output activation functions. Meanwhile the contents of the organic memory are simultaneously scanned by a CPU from a second port without the need for special access protocols or timing changes in either the organic memory or the CPU. Protocol-free, multi-ported memories facilitate the interfacing of multiprocessors and an address bus expansion circuit further reduces the need to access slow peripheral memories.

1 Claim, 5 Drawing Sheets

METHOD OF INTELLIGENT COMPUTING AND NEURAL-LIKE PROCESSING OF TIME AND SPACE FUNCTIONS

BACKGROUND OF THE INVENTION

The present invention owes its existence to years of effort in bringing low cost and simplicity to the design of data acquisition and representation systems. It began as an adaptation of video arcade game technology to the needs of low cost medical instrumentation.

The all-important video display underwent further refinements, leading to a patented vector generator built with low cost, standard D/A converter arrays. This vector generator is described in U.S. Pat. No. 4,649,506 entitled "Vector Generator Using Interpolative Analog Circuits."

Particular emphasis was then given to circuits capable of offloading functions from the software for true real-time performance. A number of digital and analog peripheral circuits were developed for the purpose. Some of them addressed the special problem of pattern recognition and were described in U.S. Pat. No. 4,809,222 entitled "Associative and Organic Memory Circuits and Methods."

More recently attention was given to the need to configure the present invention as an array of multiprocessing units. U.S. Pat. No. 4,984,176, entitled the VDH Biocomputer describes a method of using dual-ported cache memories that can be shared by one or more processors. It also introduces a brand of software with a simplified syntax and a "dispatcher" routine whose effect is to maintain good visibility regardless of scale.

The latest efforts have served to further identify the key relationships between functional blocks in relation to intelligent computing.

The standard CPU consists of circuits to fetch instructions, move data, implement branching instructions and perform additions, subtractions and a few control and Boolean logic operations. The movement of data between the CPU and memories and circuits external to it usually involves more than one instruction cycle. Arithmetic operations more complex than additions and subtractions and mathematical functions must be implemented in software, in which case they require many instruction cycles; or they must be implemented in external circuit blocks, in which case relatively cumbersome and time-consuming protocols (i.e., additional procedures to establish contact) are often involved. Since the number of memory locations that the CPU accesses through its address bus is limited, an often inordinate amount of time is spent accessing external solid-state or disk memories. The activity of the CPU is thus characterized by many small steps and delays. Each step is also reflected in the software, which grows very rapidly in size and complexity. Unless special programming techniques—and a lot of discipline—are used, a point is soon reached where software problems become intractable. It is no surprise that the scope and size of a computer system is limited by the software, not the hardware.

The greatest challenge is to find efficient methods of dealing with the real world, where inexact quantities and approximations must be used. Methods of "fuzzy" computation have been available for some time to deal with this problem. They are not necessarily efficient. Another requirement includes dealing with real-life, variable objects. This has traditionally been done by using numbers to represent objects. These numbers then become symbols, the equivalent of names. But this, in itself, is not enough, since real objects must also be recognized as belonging to a name or symbol despite individual variations. The ability to recognize a sameness in different objects calls for intelligence: each object must pass certain tests to determine whether it has the required qualities or features. Ordinary computers do not have the necessary means or power.

A number of inventions are already on record which describe a CPU or other processor that includes enhanced computational elements, notably multipliers, instead of or in addition to the traditional ALU (Arithmetic Logic Unit). This is especially useful for Fourier and other transformations, but does not go far enough for intelligence as defined in the preceding paragraph.

NOVELTY OF THE INVENTION

The present invention addresses and overcomes significant shortcomings of the prior art by identifying and providing the optimum means and methods for building intelligent computers as simply as possible and at the lowest possible cost.

The present invention provides a few, unchanging building blocks with which to build intelligent computers, from the simplest to the most complex. The hardware is thus "upward compatible," a fact that also takes into account the requirements of software in large and small systems alike.

The present invention provides a combination of said unchanging building blocks for the simplest, most effective implementation of multiprocessing elements and arrays of interconnected multiprocessing elements.

In a more informal manner, and for the purposes of evoking a clearer understanding in the mind of the reader, it could be said that the present invention is "an erector set for intelligent computers."

SUMMARY OF THE INVENTION

The present invention greatly expands the amount of memory directly accessed by a CPU and allows said CPU to work with more than one area of memory in a single instruction time. A special memory controller insures that CPU instructions are always fetched from the same memory bank (or block) but allows a CPU to designate in advance which (same or other) memory bank is read from and which (same or other) memory bank is written to during a single CPU machine instruction cycle. Each memory bank address encompasses the same maximum number of memory locations as can normally be addressed by the CPU address bus. In a memory-mapped system, one or more memory bank addresses can be assigned to any number of peripheral devices. Directly accessed solid-state memory "cards" can then be used to replace disk and other memory systems for the storage of programs and data.

The present invention also uses dual (or multi-) ported memories that can be shared by two or more separate user means at the same time. Each said user means can be "transparent" to the other(s). This eliminates the usual protocols and delays that stand in the way of efficient, direct, random read or write access by one device to the memory of one or more others. This also paves the way for simple and efficient communication between multiprocessors. The latter can be interlinked to form many kinds of arrays of any size or shape and can include among them one or more commonly available embedded computers.

Efficient execution of intelligent tasks is delegated to a "resonant processor." The "resonant processor" is modeled after physical objects endowed with both elasticity and mass or, as in electronics, capacitance and inductance. This makes it easy to deal with or simulate behaviors or characteristics best described by exponential and differential equations. Under certain conditions the "resonant processor" can work like a neural network but has the additional advantage that it deals with functions of real time. The resonant processor also shares some of the performance characteristics of analog computers. It is however much more programmable and versatile.

The architecture of the present invention has been carefully orchestrated in view of the special requirements of the software and vice-versa. The software has already been described in U.S. Pat. No. 4,984,176. It requires transportable machine code that contains its own memory resources (object code interspersed with memory locations dedicated to data storage). In short, the hardware accommodates software "objects."

DETAILED DESCRIPTION

CPU

Figure 1:
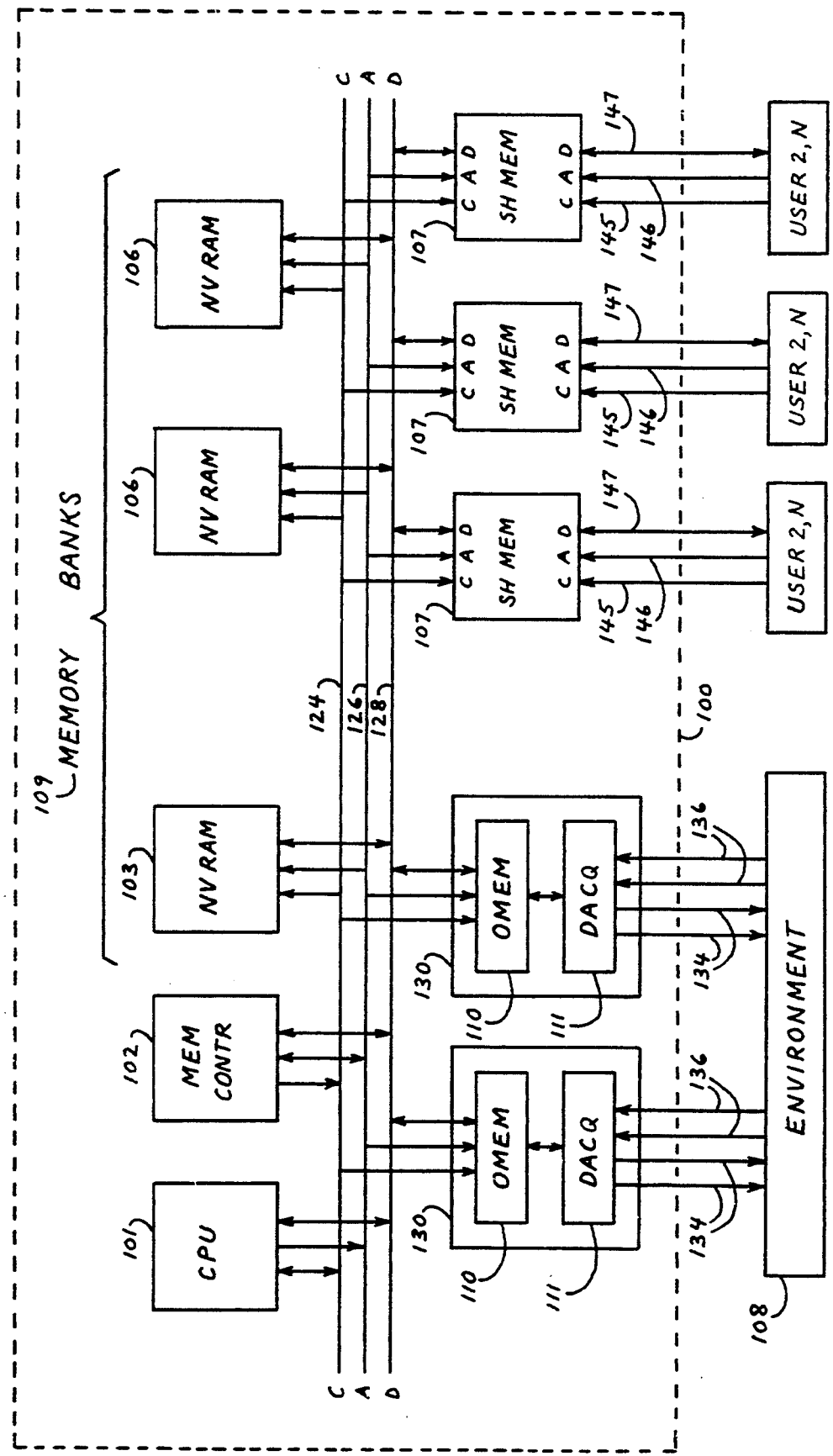
FIG. 1 illustrates the multiprocessing element (100) of the present invention.
Figure 5:
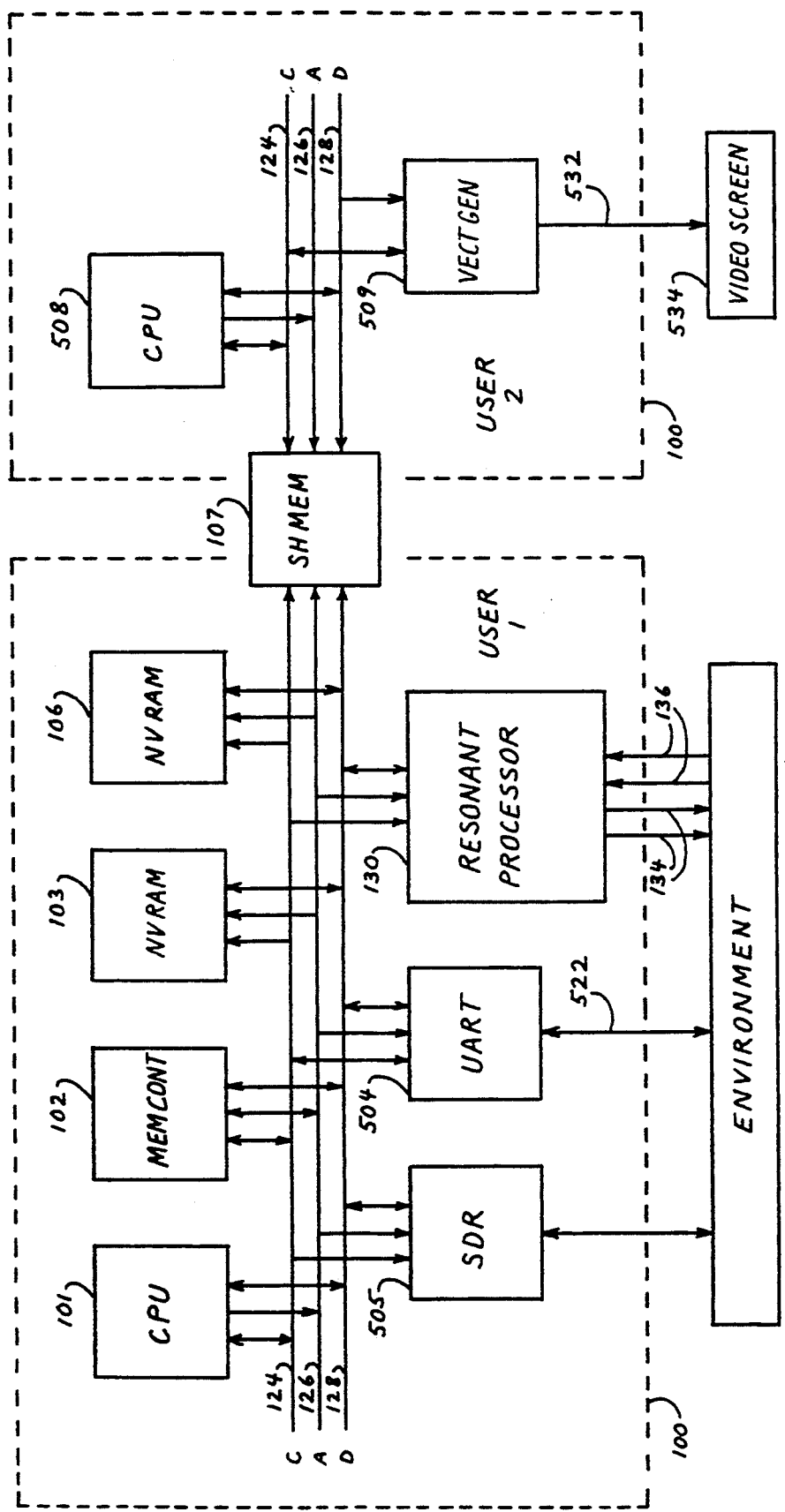
FIG. 5 illustrates a minimum system which includes all of the options and expansion features of the invention.

Referring to FIGS. 1 and 5, central processing units (CPU) (101) and (508) can be the same or different models.

All traditional CPUs are circuits that interpret and execute digital instructions from a list called a "program." Their purpose is to control and implement (or cause to implement) sequence of events and processes.

The CPU as a standard and well-documented means is usually known as a microprocessor in its modern integrated circuit version. As is well known, microprocessors control and access memories and peripherals through control buses (C) and address buses (A), and transmit and receive data to and from said memories and peripherals through data buses (D). Microprocessors, depending on the instructions they are executing, can also cause said memories and peripherals to exchange data between each other through said data buses (D). Buses are reminiscent of telephone networks because the same number of wires can serve to connect each user to one or more other users. It is the microprocessor(s) that designate, through control and address buses (C) and (A) who will be the sender and who the receiver (s) of data at any one moment in time.

Globally speaking and in the context of the present invention, the CPU evolved as the most versatile digital circuit. It works by performing small, specific digital operations at very high speeds. It is considered, at least for the moment, to be the heart of the computer. It is adequate for performing some primitive numerical and logic operations and controlling the order in (but not the time at) which processes take place. It is not well suited for parallel processes, fast or complex computations and decisions based on inexact or "fuzzy" quantities (or real time.) These shortcomings are especially apparent when dealing with typical, real-world situations where it is necessary to associate objects with variable features or qualities with the numerical symbols used by the computer. As has been pointed out before, this takes a higher level of "intelligence."

Memory Control

Refer to FIG. 1

Memory control circuit MEM CONTR (102) is an auxiliary memory manager under the control of CPU (101). It is used to expand the area of memory that can be directly addressed by said CPU (101).

For the purposes of the present invention, the term "memory bank" refers to a memory means with a maximum capacity equal to the number of memory locations that can be selected by the original CPU address bus, i.e., without the help of memory control means (102).

Memory control means (102) adds a number of memory bank address lines (B0-7) to the original address bus (A), thereby making it possible to access several memory banks as defined above. For instance, if CPU (101) comes equipped with 16 address lines, it is capable of addressing (unaided) approximately 65 Kilobytes of memory. If to these original 16 address lines one adds 8 memory bank address lines (B0-7) the total number of address lines in bus (A) is 16+8=24 and the total amount of memory selectable with bus (A) is now 256 times greater or almost 17 Megabytes.

However it is not prudent to allow CPU (101) to fetch instructions from more than one memory bank selected in advance for the purpose. In the present invention, non-volatile random access memory means (103) is designated as the one, and only one, from which instructions will be fetched by CPU (101). This does not mean that other memory means, for instance one of a plurality of added, non-volatile random access means (106), cannot contain instructions to be executed by CPU (101). Rather, it means only that instructions to be executed by CPU (101) must first be present, or, if necessary, copied into non-volatile random access memory means (103).

Thus, when CPU (101) is in the instruction fetching part of a machine cycle memory control means (102) is effectively disabled. However for the rest of the machine cycle, i.e., the part in which an instruction is executed, CPU (101) is allowed to read or write in the other memory banks with the help of memory control means (102).

Figure 2:
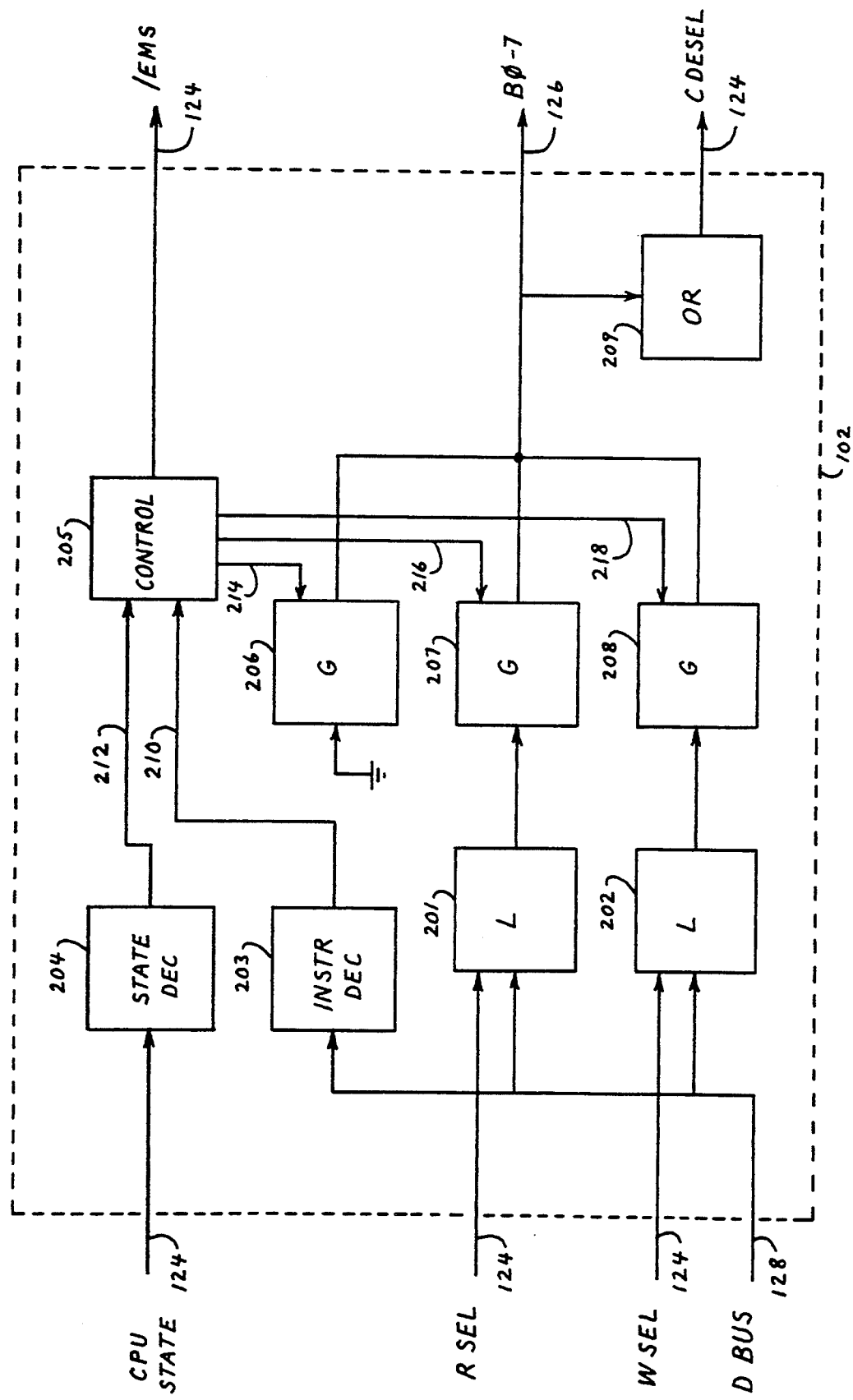
FIG. 2 illustrates the memory control means (102)

Memory control means (102) is illustrated in greater detail in the diagram of FIG. 2.

Memory control means (102) uses two of the standard output ports of CPU (101), here illustrated as first and second standard output port latches (201) and (202). The data sent to and stored in said latches represents two sets of optional memory bank addresses (B0-7). The first means (201) receives a byte identifying the memory bank to be accessed in a read operation and the second means (202) a byte identifying the memory bank to be accessed in a write operation.

Means (203) is an instruction decoder used to identify the CPU instructions that are safe to use when accessing memories other than means (103).

Means (204) is a state decoder for detecting the onset of a CPU instruction fetch.

Means (205) is a control circuit for generating an External Memory Select signal (/EMS) for signaling peripheral devices that the memory address is stable. Said means (205) is also used for generating control signals for transmission gates (206), (207) and (208) which connect memory bank address bus (BO-7) to ground via gate (206), to the read address stored in first output port latch (201) via gate (207) or to the write address stored in second output port latch (202) via gate (208) depending on the state of CPU (101), as decoded by state decoder (204), and/or the instruction on the data bus as decoded by instruction decoder (203).

Means (209), an OR gate, detects the condition where the memory bank address (BO-7) is other than zero. When this is the case, it generates a signal (C DESEL) for deselecting the abovementioned memory means (103) where CPU (101) fetches its instructions.

To summarize, memory control means (102) will cause CPU (101) to fetch instructions only from memory means (103). It will generate different read and write memory bank addresses (BO-7) at the appropriate time of the same instruction cycle if allowable according to the instruction being executed by CPU (101). At all other times, including when the addresses stored in latches (201) and (202) are 00, a memory bank address 00 is output on memory bank address bus (BO-7). This has the effect of causing memory means (103) to be selected by default.

Note that output port latches (201) and (202) are initialized to zero when the CPU is reset. Thus memory means—or bank—(103) is always selected immediately after CPU (101) is reset and until said CPU (101) loads addresses other than zero in output port latches (201) and (202).

In terms of the global architecture of the present invention, memory control means (102) is needed to speed-up and simplify access to all data sources and destinations. In particular, it enhances random access to peripheral sensors, devices, processors and memories, virtually all of which are memory-mapped. (The standard input/output ports are preferentially used as external data registers.) The goal of real-time processing is thus attainable in a greater number of applications. Memory control means (102) also makes it possible to eliminate most, if not all slow peripheral memories (such as disk drives).

Non-Volatile, Random Access Memory

Referring to FIG. 1, memory means (103) and (106) are standard Random Access Memories (RAM) which are made non-volatile by a circuit that includes a backup battery or some other means or method. Any means or method which causes data to be retained when electrical power is removed is acceptable provided it does not interfere with normal RAM operation, i.e., high-speed random read and write operations.

Means (106) represent one or more added, non-volatile random access memories.

Non-volatile RAMs (103) and (106) preferentially replace ordinary RAMs, ROMs and disk memories. They are compact, rugged, conveniently transportable and, last but not least, commercially available.

In a typical embodiment, non-volatile RAMs (103) and (106) each include a RAM suitable for battery backup operation, a long life battery and circuits to control the transition from normal (system) to stand-by (battery) power and vice-versa. Suitable methods of isolation from host buses may also be included which take into account the possibility of plugging or unplugging a given non-volatile RAM cartridge with host computer or device power either on or off.

From a global, architectural point of view, the software requires that memory resources (normally in RAM) be locatable near the object code of the CPU (at least part of which customarily resides in ROM). The non-volatile RAM is needed to lessen or eliminate the need for ROMs and slow and/or external non-volatile memories. It can be pre-programmed externally and then plugged into the computer. It can be used as a "program card" singly or in combination with others to replace disk memories. Besides avoiding the complexities and delays inherent in the use of both hard and floppy disks, it makes it possible to experiment with different operating systems. The battery backup RAM on a card is now becoming a standard, commercially available item.

UART

Refer to FIG. 5

The purpose of UART (504) is to provide serial communication capabilities to the computer. This technology is well known and widely used.

UART (504) is known as a Universal Asynchronous Receiver Transmitter. In a typical embodiment, one or more UARTs like it would be connected to the outside world, i.e., to keyboards, modems, displays, etc., via a serial interface. Of course, it is possible to comtemplate embodiments where a UART is not needed or used.

From a global and architectural perspective, the UART is mentioned in the present embodiment because it is more likely to be needed than any other peripheral device, and also because it serves as a good example of a moderately complex one.

It has been mentioned in the context of the present invention that peripherals, and the accessible registers within them, are memory mapped as a general rule. Input/output ports can also be used in limited applications where it is more advantageous to do so. This latter option must be chosen in relation to the microprocessor used in the implementation of CPU (101).

Memory mapping allows for easy and virtually unlimited control of large numbers of peripherals. Data can be sent or retrieved, registers loaded and interrogated and protocol signals generated simply by accessing contiguous addresses.

Globally speaking, serial communication includes the possibility of dealing successfully with unknown or unfamiliar sources or destinations of data that can be accessed only through a single data port (serial or parallel). The method inherent in RPN (Reverse Polish Notation) and VDH software (patented) consists of sending first qualifying information about the data that follows (pre-requisites first.) This can be accomplished in successive steps of increasing complexity until enough information is at hand for the reception or even the processing of the main body of information. Metaphorically speaking, the sender begins by "teaching" the receiver to receive. The information about information discussed here can go so far as to include "directions for use" and software programs. There is even the possibility of providing a means by which unknown communication protocols (a form of algorithmic processing) can be programmed "on the fly." Last but not least, the receiving entity has the choice of skipping the information about information when it is not needed.

Seeder

Refer to FIG. 5

Seeder SDR (505) is an optional means for manually entering, checking and editing data in RAM, as well as for diagnosing problems in multiprocessing element (100) without the need for any other additional means.

Its purpose is to to enter bootstrap (i.e., startup) code in RAM in the absence of a ROM or other means for the purpose; to enter or modify code in RAM when a more direct access is desired or needed than that normally provided for the purpose; to "debug" the computer and, if desired, the software.

The seeder typically includes a keypad with 16 hexadecimal number keys; address increment, address decrement and address reset push-buttons; data entry and data repeat push-buttons; a data/address selector switch; a four-digit hexadecimal address video display; a two-digit stored data hexadecimal video display and a two-digit keyed data hexadecimal video display. Other configurations are also possible.

When the seeder is plugged into the computer bus, it causes the CPU to "float," or relinquish control of the bus. This avoids bus contention problems.

The seeder can easily be designed and built, as described above or with some variations by a person versed in the art.

From a global and architectural point of view, the seeder is a tool that makes it possible to avoid separate "development systems." It makes it possible to "bring to life" or "resurrect" the computer "from the ground up," i.e., with no previously operational hardware or software.

Note that the bootstrap code can be designed so that programs can subsequently be transferred from a word processor or personal computer to non-volatile RAM (103) via standard serial interface and UART (104). The size of such a bootstrap program would be quite small and would only take a few minutes to key in. A person versed in the art would find it easy to accomplish.

In the event that it is not desired to use the seeder, a special circuit, composed of a ROM, a counter, a timer and some "glue logic" can be designed to take control of the bus for a brief moment after power-on to permit the bootstrap code to be loaded into non-volatile RAM (103). The design of such a circuit is also straightforward for a person versed in the art.

Shared Memory

Standard memory devices are not normally built so that a storage location at a given address can be written into or read from by more than one user. The part of the memory hardware that is used as an interface to said user is referred to as a "port." When two users are accommodated, there are two ports and the memory is referred to as a "dual-port memory." Such a memory is very useful in certain applications. Dual-port memories are a requirement in the architecture of the present invention. More than two ports could conceivably also be justified.

"Transparency" is an additional advantage and will be covered in what follows.

Figure 3:
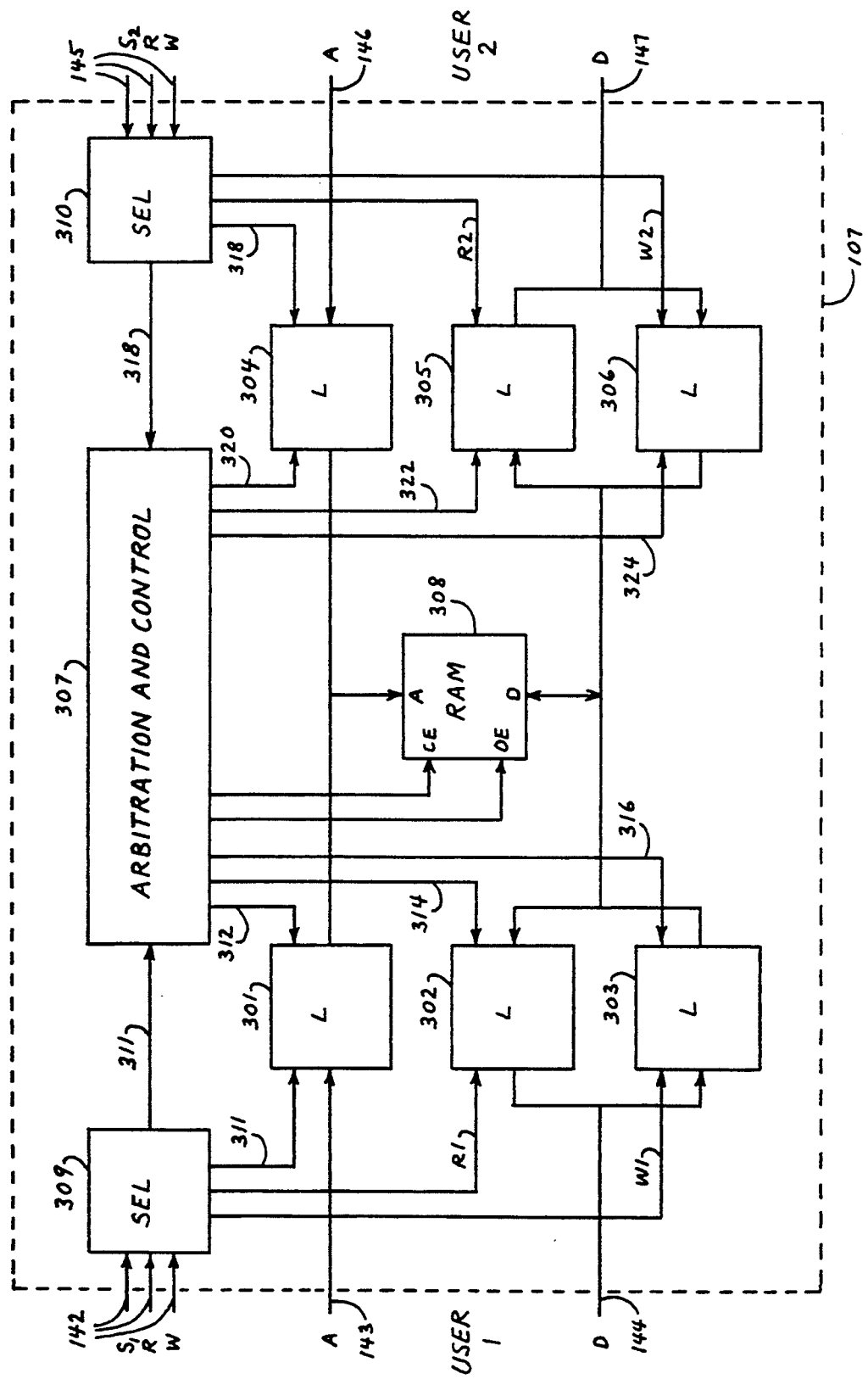
FIG. 3 illustrates the shared memory means (107)

The shared memory SH MEM (107), of which a plurality is shown on FIG. 1, is described in greater detail in FIG. 3. Referring to FIG. 3, then, SH MEM (107) is a memory that two or more separate users can access at the same time without danger of mutual interference and without the need for external arbitration, time-sharing protocols or any other additional precaution. Said two or more users do not "see" each other and are "transparent" to each other if, as is intended, said two or more users allow sufficient time for said shared memory (107) to complete its internal cycle(s) of operation.

In the description that follows, only two users, user 1 and user 2 are considered, with the understanding that the same technique can be extended to more users. The Figures refer to this plurality of more than two users by designating them as USER 1, USER 2, USER N. It is expected that in the majority of cases shared memories will only have two users.

SH MEM (107) includes one set of buffers (301), (302) and (303) for USER 1 and one set of buffers (304), (305) and (306) for USER 2. Buffers (301) and (304) are input ports for addresses supplied by users USER 1 and USER 2. Buffers (302) and (305) are output ports for data read from the internal RAM (308)—the one whose contents are shared by USER 1 and USER 2. Buffers (303) and (306) are input ports for data from USER 1 and USER 2 to be written into internal RAM (308).

Selection circuits (309) and (310) and arbitration and control circuit (307) orchestrate the sequence of events as follows:

As soon as USER 1 selects said SH MEM (107) by means of a select signal S1, address A supplied by it is latched in buffer (301). If the read signal R from the control bus of USER 1 indicates that USER 1 wants to store information, the data from its data bus D is captured in latch (303). If or when SH MEM (107) is not busy servicing USER 2,N RAM (308) receives the address stored in buffer (301) and the information captured in latch (303) is stored in it at the address supplied by buffer (301).

If, on the other hand, write signal W indicates that USER 1 wants to read information, if or when SH MEM (107) is not busy servicing USER 2,N the address from latch (301) is supplied to RAM (308) and the information read from it is latched in buffer (302), where it waits for USER 1 to read it in turn.

The same sequences of events take place for USER 2, except that buffers (304), (305) and (306) are involved, and USER 2 waits until SH MEM (107) is not busy servicing USER 1,N. For each additional user up to USER N three additional buffers are needed and the maximum time to be serviced is correspondingly increased.

The time for two complete read or write cycles of SH MEM (107)—one for USER 1 and one for USER 2—represents the worst case access time of SH MEM (107) with two users from the point of view of each said (computer or other) USER 1 or USER 2.

SH MEM (107) makes an important global contribution to the architecture of the present invention.

One of the most important advantages has to do with software. Indeed, it is logical to use memories as "buffers" to store intermediate parameters and results between processing blocks.

SH MEM (107) is also ideal in large systems, when different timing clocks are used and when it is important to avoid interruptions in the basic cycle of a processor.

SH MEM (107) paves the way for efficient multiprocessing. With computers sharing memories in common (including the instruction memory) it is possible to link each one of them intimately with one or more neighbors to form a two-dimensional array, a cubic array, a multidimensional array or any other configuration. Control and information can be passed from one unit to the other in much the same way as in communities of living beings. It is possible to implement the analog of human institutions such as monarchies, democracies, etc., the analog of the post-office being one of the most obvious.

To summarize, SH MEM (107) belongs at the boundary between modules that need to communicate asynchronously and as simply and directly as possible. For instance, it is advantageous to use SH MEM (107) as the memory of a computer or sequencer that must be interrogated or re-programmed "on-the-fly." Examples of computer or sequencer controlled peripherals that greatly benefit from the use of SHMEM (107) are video generators, audio generators and, last but not least, the resonant processor (110) of this invention (see later).

Vector Generator

Refer to FIG. 5

Vector generator (509) is a means for generating high-quality text and graphics by means of a random scan method. It features control over line thickness, intensity, color and texture and facilitates animation.

Its purpose is to convey intelligence by means of animated sketches drawn with colored and textured lines.

Vector Generator (509), in its analog circuit version, has already been described in U.S. Pat. No. 4,649,506. Digital versions are also possible, but there are cost/performance tradeoffs to consider.

The choice of a vector display, rather than a raster display, is discussed in what follows.

The video display is the main and most efficient machine means for conveying information to a human. Among images, the sketch, and its ultimate evolution, the ideogram, are very high in intelligence content, and have minimum redundancy. In computer parlance, they represent highly "compressed" images. Color and texture enhance recognition and add to the feelings and emotions of the viewer. They act as motivators.

Television (and computer) raster scan images are mosaics of "pixels" (picture elements). The eye strains to focus. The artifacts that are present in lines drawn at an angle are also very irritating to the eye, especially when the image is animated and does not benefit from the blending effects inherent in natural images but absent from computer generated images.

Vector technology, also known as X-Y or random scan, moves the "spot" (i.e., the location where the current pixel is being generated) only along the path defined by the lines to be drawn on the screen. It wastes no motion. The lines generated on the screen are so bright and so smooth that color vector displays can be used satisfactorily in broad daylight. Vector displays have been used for air-traffic control since the beginning and have since been adopted for "heads-up" displays, aircraft cockpit instruments and medical instruments.

A vector generator is essentially a plotter that uses the phosphor screen of a CRT instead of a sheet of paper to draw on. Before an image can be displayed in vector form some processing must take place. The amount of processing ranges from trivial for symbols to excessive for natural images like photographs. Drawings can be converted if they are kept simple enough.

As was mentioned earlier, vector images are a highly compressed form of representation. The information needed to store or display a vector image consists mainly of the coordinates of the start and end points of the lines to be displayed. This reduces memory requirements by a factor of at least 100 as compared to those of the equivalent raster display. However generating a random scan is not as simple as generating a raster scan. Critics of vector displays have emphasized this point. They also claim that vector displays consume an inordinate amount of power and that line thickness cannot be controlled.

The present invention benefits from decades of being at the forefront of the development of vector displays. The proprietary circuits described in the abovementioned patent show a relatively simple and versatile hardware method of controlling line placement, quality, color and texture. The circuit configuration also facilitates object placement and animation. If the application warrants it, hardware can be added for the generation and animation of circles and ellipses in real time. Vectors can also be stored in three dimensions with X, Y and Z coordinates. This is useful for showing objects in three dimensions, rotating them on screen in real time and enhancing them so that the nearest lines/objects appear brighter.

Power consumption is a function of the total number of vectors or the total accumulated length when the vectors are placed end to end.

The use of a CRT with an electrostatically deflected electron beam results in a lighter assembly with improved X-Y bandwidth and reduced power consumption. This also makes it possible to generate images with a larger number of vectors. An electrostatic deflection X-Y display is of course available in all analog laboratory oscilloscopes.

One of the ways of controlling line thickness is by changing the focus of the CRT. This results in a fuzzier "spot" and the effect resembles that of an air brush. The video signal (beam on/beam off) can also be modulated by a square or sinusoidal wave to obtain unique line textures and color blending effects.

In short, vector (random) scan is more effective than raster scan in representing intelligence and is practical provided that some restraint and imagination are used. The computational power requirements are only a small fraction compared to raster displays—an advantage that is perhaps more important than the savings in memory requirements. Indeed, no amount of software can make up for the lack of real-time capability. This is dramatically evident in the case of 3-D and animation.

The conversion from analog vectors to digital coordinate points and vice-versa represents but one aspect of the general problem of transitions between the "smooth" analog world and the "granular" digital world. The most compact or "intelligent" way of representing a smooth function in the digital world is by its mathematical equation. A more usual and practical way is to approximate a smooth function as a series of short, interconnected linear segments. Then all that is necessary is to store in memory the coordinates of the starting and ending points of each segment. Reconstruction of each segment can be accomplished by means of a technique of integration or interpolation. The same holds true whether the smooth function represents a visual contour, a sound wave or a physiological measurement such as blood pressure. The method of interpolation used in the vector generator can be used to reconstruct not only video, but also sound and other waveforms. It is inherently simpler and does not have the problem of accumulating errors that is typical of methods where integration is used.

Resonant Processor

The mathematical equations that describe physical phenomena are based on proportion rather than quantity. Quantity is the subject of arithmetic—addition, subtraction, multiplication, division, etc. Proportion is the basis of the higher mathematics that describe change in the physical world. Two simple examples follow.

On a piano keyboard, the frequency (pitch) of any note is obtained by multiplying the frequency (pitch) of the previous (lower) note by 1.059. The ratio of the frequencies of two adjacent notes, i.e., one half-tone apart, is 1.059. (This is verified by the fact that there are twelve half-tones in an octave; 1.059 multiplied by itself twelve times is equal to 2.)

In a pail of water with a leak in the bottom, the water level will vary as follows: if after one minute the level is ½, then the next minute it will be ¼, the next minute ⅛, the next minute 1/16, etc. To obtain the next level one multiplies the previous level by ½; the ratio between water levels one minute apart is ½.

A function where a quantity keeps on being multiplied by the same (ratio) number is an exponential function.

In the piano example, the exponential function is:

$$F = F_o \times (1.059463)^s$$

where F is the pitch of a key s spaces to the right
Fo is the pitch of the reference key
s is the distance in number of intervening keys
For the level in the pail of water, it is:

$$L = L_o \times (0.5)^t$$

where L is the water level after t minutes
Lo is the level at time t=0 minutes
t is the time in minutes In the examples above, s and t are the exponential variables—the first, a space variable, the second a time variable. In the mathematics of physical phenomena, time and space can be exchanged. The same equations apply.

Functions of time and space can be "sliced" into small increments in which the time and space variables are assumed to remain constant. If said increments are small enough, the resulting error is small also. In the resonant processor of the present invention, for each said increment of time or space the data (for instance the pitch of the sound or the level of the water in the above examples) is retrieved from its storage location at a memory address A, multiplied by a number (for instance 1.059 or 0.5 in the examples above) and returned to its storage location at said memory address A. The number by which the data was multiplied (1.059 or 0.5) before being returned to said storage at memory address A is the quality factor Q and the number of times the process cycle is repeated represents the space variable s or the time variable t.

In the above process the data is said to go around in a "loop" that starts and ends at a memory location with an address A.

To complete the picture, it is also necessary to consider where the initial value of the data stored at memory address A came from in the first place. For this, a source of data ID is considered. Some kind of "coupling" must occur between source ID and the memory location at address A. This is described by a weight factor W that determines the ratio or proportion of the data obtained from source ID that reaches its destination at memory address A.

Thus two main processes occur during said processing cycle (or loop): first an input quantity x is obtained from a source ID, multiplied by a weight W and stored in memory at an address A; then data previously stored at said address A is multiplied by a quality factor Q and added to the contents at said memory address A.

When the Q factor remains unchanged over a number of cycles t, an exponential function of the form $x * Q^t$ is obtained.

When the weight factor W varies like the data from source ID, the result is a resonant system where the numerical value of the data in the loop increases steadily. An analogous situation is observed in physical resonant systems when energy is added "in phase."

Hence the name "resonant processor."

The resonant processor of this invention can be used for recognizing patterns by supplying the proper functions of ID, W, Q and A and observing how the values of the data stored in memory at locations A vary with time.

Because it is possible to use variable functions for the source ID, the weight W, the quality factor Q and the address A, more functions can be recognized with the resonant processor of this invention than would be possible with any of the other commonly known means. More on that later.

The resonant processor is shown on FIG. 1 as means (130) and includes means (111), which is a data acquisition device, and means (110), an organic and associative memory already described in U.S. Pat. No. 4,809,222. As used in that patent, the term "organic memory" referred more particularly to a system in which ". . . information already in storage is enhanced or degraded with each new access."

Figure 4:
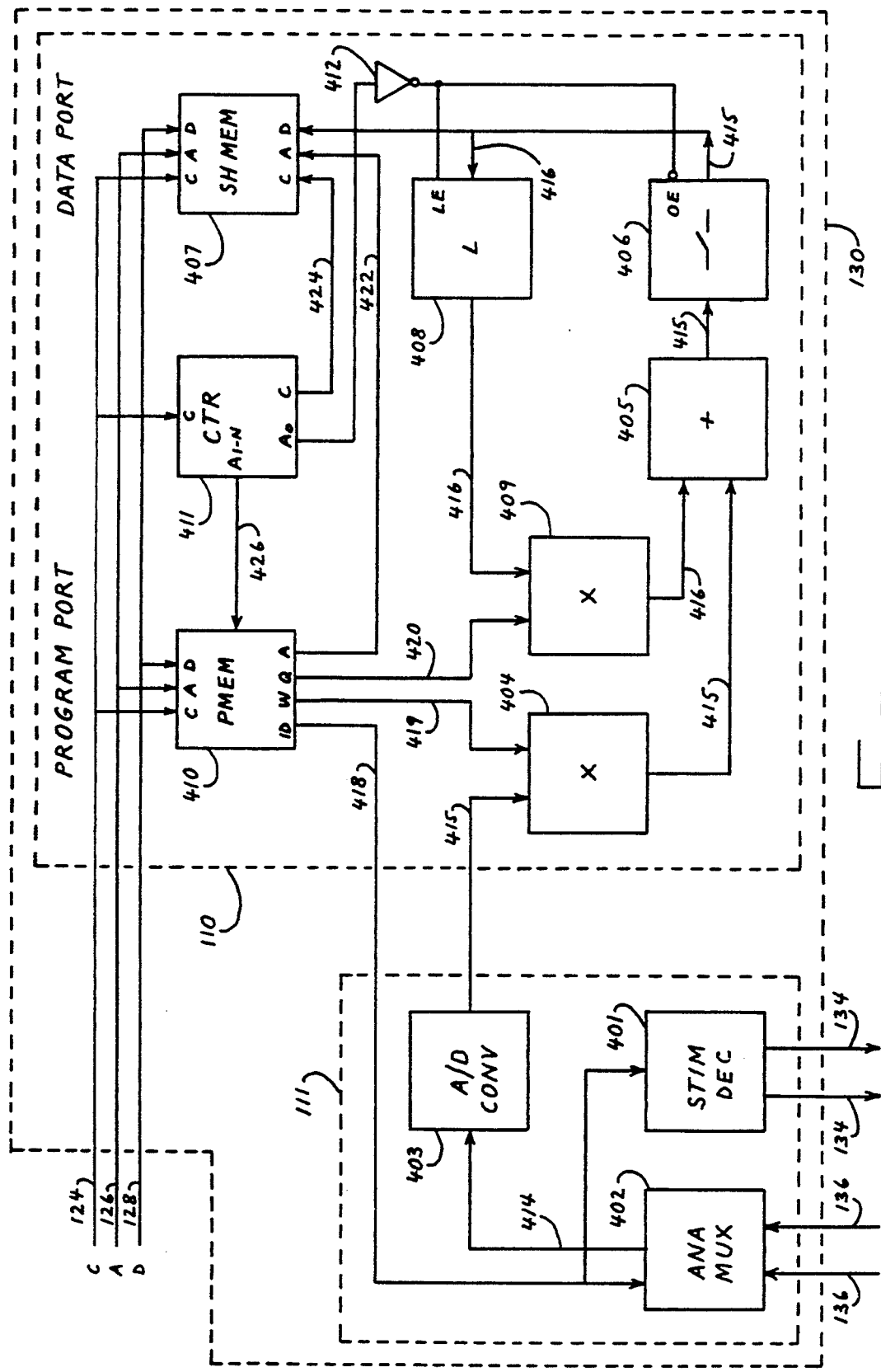
FIG. 4 illustrates the resonant processor (130)

Resonant processor (130) is described as a synergistic whole in FIG. 4. Said "organic memory" portion includes key means (404), a first digital multiplier, key means (405), a digital adder, key means (407), a shared memory similar to means (107) previously described, and key means (409), a second digital multiplier.

Referring to FIG. 4, means (401) (STIM DEC) generates electrical potentials or currents which, when applied to external objects or devices cause secondary electrical potentials or currents to occur in said external objects which are indicative of conditions(s) or parameter(s) of interest; means (402) (ANA MUX) represents data acquisition, conditioning and multiplexing circuits as are well known in the art; means (403) (A/D CONV) is a circuit for converting analog signals into their digital equivalent and is well known in the art; means (404) and (409) are digital multipliers (for instance "Cray Multipliers") as are well known in the art; means (405) is a digital adder as is well known in the art; means (408) is an ordinary digital data latch; means (406) is an ordinary digital transmission switch/gate; shared memory SH MEM (407) is a circuit which is distinct but whose performance is identical to that of the shared memory (107) described earlier; evolution program memory PMEM (410) and clock/counter CTR (411) will be discussed later.

Means (401), (402) and (403), which have already been discussed and constitute the data acquisition circuits DACQ (111) in FIG. 1, must be designed for random, real-time access to sensors and/or other external sources of information in the environment. This is also a well-known art.

One of the distinguishing features of the resonant processor is that its architecture accommodates two main data paths: the first, which will be referred to as the input path, starts at data acquisition elements (402) and (403), proceeds through first digital multiplier (404), digital adder (405), switch/gate (406) and ends in SH MEM (407); the second, which will be referred to as the regenerative path, starts at SH MEM (407), proceeds through digital data latch (408), second digital multiplier (409), digital adder (405), switch/gate (406) and ends in SH MEM (407), where it originated.

Another distinguishing feature of the resonant processor is that the value of the signals in the input path are scaled by a "coupling factor" or "weight" (W) while the value of the signals in the regenerative path are scaled by a "loss" or "quality" factor (Q).

A third distinguishing feature of the resonant processor is that the identity (ID) of the source of signals connected to the input path, the weight factor (W), the address (A) in SH MEM (407) and the quality factor (Q) all are controlled and updated at the same time by PMEM (410).

Evolution program memory PMEM (410) outputs digital words that are typically much longer than expected from the usual RAM. For instance, if the digital codes describing the identity of the stimulus/sensor (ID), the weight factor (W), the quality factor (Q) and the address (A) in SH MEM (407) each contain 16 bits, the digital words output by PMEM (410) have a length of 16 bits×4=64 bits. Each such 64-bit word corresponds to a single address generated by clock counter CTR (411).

Clock counter CTR (411) generates addresses that represent evolutionary steps. In many cases, as in the spectrum analysis of sounds, each said address corresponds to a slice or interval in real time (or space). Each said address can also represent a unit of relative or impulse time. In applications where voting processes are taking place or when neural networks are being modeled, each said address occurs as a function of computer cycles of operation. In FIG. 4, said addresses that represent evolutionary steps are shown to originate at terminal (A1-n) and reach PMEM (410) through clock counter address line (426). Note that evolutionary step address (A0) is reserved for the operation of digital data latch (408) and switch/gate (406). This has the effect of dedicating two clock counter CTR (411) periods for each evolutionary step, one in which latch (408) acquires the previous value stored in address (A) of SH MEM (407) prior to multiplying said previous value by quality factor (Q), and another in which switch/gate (406) connects the output of adder (405) to said address (A) in said SH MEM (407) for (re)storage.

CTR (411) loses control over the address bus of PMEM (410) when an outside user, typically a CPU, sends to it the appropriate control signal. An evolutionary program, consisting of a sequence of words descriptive of evolutionary steps as previously discussed, can be loaded in PMEM (410) via control, address and data lines (C), (A) and (D) through the program port of PMEM (410). PMEN 410 will behave like a regular memory when controlled from said program port.

PMEM (410) and CTR (411) can thus be interrupted, reloaded and reset by said outside user. SH MEM (407) can use a similar priority access scheme or it can be a dual-port memory as shown on FIG. 1 and previously discussed as means (107). In the preferred embodiment the organic memory and (typically) a CPU have simultaneous transparent access.

The following is an example of typical operation for the resonant processor of FIG. 4.

After the peripheral stimulus generators and data sensors, means (401) and (402) are correctly connected to one or more external objects or organisms in the environment, the CPU, for instance CPU (101), loads one or more evolution programs in PMEM (410) via its program port. As soon as CPU (101) relinquishes control of PMEM (410) and CTR (411), CTR (411) takes over automatically, setting its own pace, incrementing addresses and thus causing evolutionary steps to be executed one after the other until the highest evolutionary step address is reached, at which point the count proceeds again from zero, on and on.

Depending on the particular (W) and (Q) values used in the evolutionary program, and with the passing of time, results progressively emerge and may eventually reach a steady state in the form of numerical values stored in one or more memory locations of SH MEM (407). Each memory location or group of memory locations of SH MEM (407) can represent a particular feature, object, pattern or situation. The latter can be independently monitored by reading through the data port of SH MEM (407).

In what follows, a single evolutionary step is described in greater detail.

Recall that in FIG. 4 PMEM (410) addresses consist of CTR (411) outputs (A1-An) and that each evolution step is in reality two sub-steps, controlled by the least significant bit, CTR (411) address output (A0). Said two sub-steps consist of one read operation followed by one write operation at the same address (A) in said memory SH MEM (407). Said least significant bit is in a low state during the read operation and in a high state during the write operation.

For each evolutionary step or change in the output (A1-n) of CTR (410) connected to the address input of PMEM (410) the following occurs:

PMEM (410) outputs words (ID), (W), (Q) and (A) in parallel. The (ID) word contains the identity of a given stimulus/sensor and is sent to STIM DEC (401) and ANA MUX (402). ANA MUX (402) conditions and connects the output of the sensor selected by the (ID) word to A/D CONV (403), which then sends the digital output equivalent signal to first multiplier (404). If the object monitored by the sensor needs electrical stimulation in order to produce an electrical output (as is the case in impedance measurements) the (ID) word will also provide the identity of the proper excitation function to STIM DEC (401).

First multiplier (404) multiplies the digital output from A/D CONV (403) by digital word (W).

Meanwhile, word (A) is sent to the address input at the lower user port of SH MEM (407).

While output (Ao) of CTR (411) is low, the lower user port of SH MEM (407) is in the read mode. The previously stored value at address (A) of SH MEM (407) appears at output (D) of said lower user port of SH MEM (407) and is stored in latch (408). That information is then also available to second multiplier (409) where it is multiplied by word (Q). The information at the output of multipliers (404) and (409) is added in adder (405).

At this point said output (A0) of CTR (411) changes to a high state; latch (408) is enabled (i.e., stops being "transparent"), gate (406) is enabled (i.e., made to conduct), and the lower user port of SH MEM (407) is put in the write mode. The output of adder (405) is conducted to and stored at address (A) in SH MEM (407), thereby updating the value found there at the beginning of the cycle.

In what follows, some examples are given of the results that can be expected as a result of using different values for the quality factor (Q).

A quality factor (Q) with a value of zero is useful for associative linking, i.e., linking a given input to one or more addresses in SH MEM (407).

If (Q) is equal to unity, the regenerative path acts like an adder or integrator. This is suitable for linear functions such as for scoring, averaging or voting. Also, the resonant processor operates essentially as a two-layer neural network. Each input to means (402) operates as a node of the input layer, and each memory location in SH MEM (407) represents an output node. An input at a constant value can supply a threshold of activation. Weight factor (W) has the same effect as the weight of the connection between input and output nodes.

A neural network with several layers can be simulated by connecting in series several resonant processors as previously described. This can be accomplished by connecting the (A) and (C) terminals of the data port of the previous resonant processor to the (ID) signal line of the next, and connecting the (D) terminal of the data port of said previous resonant processor to the digital input line (415) of said next. In other words, the data port of the previous resonant processor becomes the environment of the following one. The same means CTR (411) can be used for all resonant processors in series as described.

For a more comprehensive review on the subject of neural networks, see "An Introduction to Neural Nets," by John McShane, published in the February 1992 issue of the Hewlett-Packard Journal.

If (Q) has a value other than one or zero, the feedback path can generate an exponential function of the generic form $e^x$. (Here e is the base of the Napierian or natural logarithms and x is the variable exponent that describes time or space.) Exponential functions describe the way natural objects gain or lose energy and $e^x$ figures in all relevant differential and trigonometric equations. It is also central to the Fourier and Laplace transforms.

In the parlance of neural networks, one might say that the invention provides nodes with more exotic activation and output functions where real time and space appear as variables.

The proper choice of (W) and (Q) values makes it possible to simulate or analyze oscillations and transient phenomena in electronic circuits and mechanical assemblies. The value of (W) is related to the "coupling coefficient" and that of (Q) to the "quality factor" or "damping coefficient." The (Q) factor then acts to control selectivity or bandpass, exactly like in a regular electronic or mechanical filter.

Patterns to be recognized often are or can be represented by one or more periodic functions of time.

Spectral analysis could be implemented by the following method. For each frequency of interest two weight factors (W) and (W') and two SH MEM addresses (A) and (A') are used. The same quality factor (Q) can be used. The first address (A) is assigned to the component in phase, and the second address (A') to the quadrature component. The first (W) sequence is a sine and the second (W) sequence a cosine function of the frequency of interest. Thus both the amplitude and the phase descriptors are obtained.

The number of samples of the input function needs to be sufficiently high with respect to said frequency of interest in order to guarantee sufficient accuracy and prevent aliasing due to the higher frequency components of the (input) signal being sampled.

Traditional methods of analysis include the Fourier Transform and its optimized version, the Fast Fourier Transform (FFT).

These methods are more specialized in the sense that they are used to characterize the harmonics of only one fundamental frequency at a time. (This is not usually a problem because most natural sounds are made-up of harmonics of the same fundamental frequency.)

Note that the data to be processed by the FFT algorithm must be stored first, since the computation does not process the input data in the same order that it is sampled. For a more comprehensive treatment of the subject, see the article published in the IEEE Spectrum magazine December 1967 issue entitled "The Fast Fourier Transform," by E. O. Brigham and R. E. Morrow.

When used as a spectrum analyzer the resonant processor of this invention need not be so limited. It can process data directly, i.e., in the order that it is sampled. Memory requirements are lessened and manipulations that interfere with real time data processing are thus avoided.

Capabilities that the resonant processing of this invention and the FFT share in common are convolution, correlation and autocorrelation.

The resonant processor of this invention is also capable of simulating "state variable," FIR and other filters.

In the general parlance of "intelligence" one might also say that the invention provides a controllable way of forgetting. The advantages may not be immediately apparent, but they are very real, if only for resolving conflicts between requirements that change differently with the passage of time, and, perhaps even more importantly, for progressively phasing out obsolete information. Systems could thus be designed to recover from instabilities that threaten their long-range effectiveness.

From a global standpoint, the resonant processor of this invention assists the CPU in dealing intelligently with the real world, i.e., with information that is only partially accurate, is a function of time and space and depends on a context. "Fuzzy Logic" and "Pattern Recognition" are commonly used, applicable expressions.

Fuzzy logic is essentially what is used by a (CPU or other) user when it "examines" the status of information in organic memory through the data port of SH MEM 407). For a good general introduction, see the article by Leslie Helm, printed in the Los Angeles Times on Monday, Feb. 17, 1992, on pages 1 and 4.

Fuzzy logic, so called, is simply a matter of dealing in comparisons, establishing limits between which functions can be allowed to vary and/or looking at percentages rather than being limited to "yes or no," "true or false," or "good or bad" choices. The latter pairs of choices reflect the only available states of a digital binary digit: a zero or a one. This limitation was never encountered in analog computers even though they already existed before digital computers.

The resonant processor of this invention makes it possible to apply a number of important analog techniques without the disadvantages of analog computers.

The architecture of this invention offloads many cumbersome functions from the software. The result is a greatly simplified software and a substantial reduction in the need for computer "power."

Simplicity and ease of use of "intelligent" methods derive not only from the synergy between real time, random data acquisition and resonant processing means, but also from extended, shared and protocol-free memory means. The CPU can load recognition or evolution programs in the resonant processor with the same ease with which it writes data in its own cache memory ("cache memory" is another way of describing NV RAM (103); it can "browse" and "observe" how the results are evolving in organic memory as easily as if said organic memory were a part of said cache memory.

Perhaps the greatest contribution of the present invention will be to help prove that intelligence in machines does not necessarily imply the usual requirements of power, complexity and cost.

Architecture Example

FIG. 5 is an illustration of a minimum system to demonstrate the architectural options and expansion features of the invention as discussed in the present specification.

The minimum system consists of two multiprocessing elements (100) linked through a shared memory SH MEM (107). The multiprocessing element on the left is referred to as USER 1, and the one on the right as USER 2.

USER 1, Besides the usual function blocks CPU (101), MEM CONT (102), NV RAMs (103) and (106) and resonant processor (130), connected to environmental sensors, also features
- a seeder SDR (505) for loading initial software and for "debugging" the hardware and software; and
- a universal asynchronous receiver-transmitter UART (504) for interfacing, for instance, with a keyboard or a dumb terminal or a word processor.

USER 2, which takes over the function of generating pictures and animating them on a video screen, includes a CPU (508) and a vector generator VECT GEN (509) connected to a video screen (534).

Note that CPU (508) of USER 2—the same or a different model than CPU (101) of USER 1—uses said a SH MEM (107) as its program and data memory. Since it needs access to only one memory bank, which in this case happens to be said a SH MEM (107), it does not need MEM CONT (102) or NV RAMs (103) and (106). And since its only function is to generate pictures from a program and data supplied by USER 1 in said a SH MEM (107) it also does not need a resonant processor (130).

As a first example, the above system has the required hardware and can be used for the development of the necessary software for recognizing some cardiac abnormalities, when connected to a set of EKG electrodes, and presenting on the video screen (534) an animated picture of the heart emphasizing the nature of the problem(s).

As a second example, after being connected to the usual gages and a limited number of additional sensors in a vehicle, it could derive a series of composite, animated pictures of status and conditions that need attending to, including navigation and service-related information.

As a third example, it could monitor a relatively small number of sensors in a home and recognize unusual or dangerous situations, including probable entry of unauthorized persons, individuals in distress, gas and water leaks, unnecessary or excessive electrical consumption, etc.

What is claimed is:

1. A method of intelligent computing and neural-like processing of time and space functions comprising the following method steps:

providing a system bus for allowing a plurality of function blocks to communicate with each other, said system bus having
- a control bus with a plurality of lines where signals indicative of timing, cycles, states and modes of operation can be conveyed between said function blocks,
- an address bus with a plurality of lines where signals indicative of an address can be conveyed between said function blocks,
- a data bus with a plurality of lines where signals indicative of information in digital form can be conveyed between said function blocks;

providing, as one of said plurality of function blocks, a CPU having a control bus, an address bus and a data bus, each having a plurality of lines, for executing software program instructions and causing computations and sequences of events to take place and
- connecting said lines of CPU's control bus, said lines of CPU's address bus and said lines of CPU's data bus to the corresponding lines in said system bus, said CPU's address bus having fewer address lines than are available in said system bus;

providing, as one or more of said plurality of function blocks, a plurality of memory banks each having a control bus, an address bus and a data bus, each having a plurality of lines, for storing information in digital form, one of said memory banks being memory bank 0 (zero) used to store the program instructions to be executed by said CPU, and
- connecting said lines of each memory bank's control bus, said lines of each memory bank's address bus and said lines of each memory bank's data bus to the corresponding lines in said system bus;

providing, as one of said plurality of function blocks, a memory control function block with outputs connected to said address lines in system bus not already connected to said CPU, said lines not already connected being hereafter referred to as high-order bits, and using said high-order bits to select one of said plurality of memory banks, and in said memory control function block first storing
- in a latch B1 the high order address of a memory bank from which it is desired to read data,
- in a latch B2 the high order address of a memory bank into which it is desired to write data,
and later connecting
- said high-order bits to the output of said latch B1 when said CPU is executing a memory read instruction, or
- said high-order bits to the output of said latch B2 when said CPU is executing a memory write instruction, or said high-order bits to ground in order to select said memory bank 0 (zero) during a time that said CPU is fetching a program instruction;

providing, as one of said plurality of function blocks, a shared memory with two ports, port 1 and port 2, to be shared between two separate users, user 1 and user 2, with said port 1 having control, address and data terminals connected to said user 1, and said port 2 having control, address and data terminals connected to said user 2, said user 1 typically being said CPU connected through said system bus, said shared memory being shared according to a method comprising the steps of temporarily storing the address supplied by said user 1 in a latch A1 as soon as a select signal is received from the control bus of said user 1 and, if said user 1 has supplied a write request signal at or before the time of said select signal, latching in a latch DW1 the data supplied by said user 1 at the data terminals of said port 1, and then, if or when said shared memory is not already busy storing or retrieving information for said user 2, storing said data now in said latch DW1 in said shared memory at the address now contained in said latch A1, if, on the other hand, said user 1 has supplied a read request signal at or before the time of said select signal, then, if or when said shared memory is not already busy storing or retrieving information for said user 2, reading the data stored in said shared memory at the address now contained in said latch A1, storing it in a latch DR1 connected to said data terminals of said port 1 and waiting for said user 1 to read it form there, simultaneously following the same steps in regard to said user 2, substituting for said latches A1, DW1 and DR1 their equivalent latches A2, DW2 and DR2 and waiting if or when said shared memory is already busy storing or retrieving information for said user 1 and servicing both said user 1 and said user 2 during a time interval smaller than the maximum memory access times listed in the specifications of either said user 1 or said user 2, so that no wait states are ever needed for and timing never affected in either said user 1 or said user 2;

providing, as one of said plurality of function blocks, a multiplexer for selectively acquiring, in random order and in real time, signals from external sources and connecting the inputs of said multiplexer to sources of said signals from external sources;

providing, as one of said plurality of function blocks, an organic memory with its input connected to the output of said multiplexer for storing items of information that can be enhanced or degraded after each new access in said organic memory, and within said organic memory providing an internal random access memory RAM, having its own control, address and data terminals, for storing intermediate values, providing a first multiplier, a second multiplier and an adder, providing logic circuits for latching previous values of said intermediate values and gating new values of said intermediate values, providing means for causing a new set of signals ID, W, Q and A to be provided each time after each said new access, for generating control signals for said internal RAM and for controlling said logic circuits, connecting the output of said multiplexer to the first input of said first multiplier, connecting said signals ID, W Q and A respectively to the control input of said multiplexer, to the second input of said first multiplier, to the first input of said second multiplier and to the address terminals of said internal RAM, connecting the output of said first multiplier and the output of said second multiplier to the inputs of said adder, connecting the second input of said second multiplier and the output of said adder to the data lines of said internal RAM through said logic circuits, and for each said new access multiplying said acquired signals from external sources by said signal W indicative of a weight factor in said first multiplier to obtain a first product, multiplying a previous signal value obtained from said internal RAM at an address location indicated by said signal A by said signal Q indicative of a quality factor in a second multiplier to obtain a second product, adding said first product and said second product in said adder to obtain a sum, storing said sum back into said internal RAM at said address location A, and instead of said internal RAM, using a separate shared memory, identical to said shared memory function block described above, as the means for storing said intermediate values, connecting the control lines of said port 1 of said separate shared memory to the corresponding control lines of said system bus, the address lines of said port 1 of said separate shared memory to the corresponding address lines of said system bus connecting the data lines of said port 1 of said separate shared memory to the corresponding data lines of said system bus, and substituting the said control, address and data terminals of port 2 of said separate shared memory to the control, address and data terminals of said internal RAM.

* * * * *